H. C. ROBERTSON.
Cover for Tea and Coffee Pots.

No. 222,840. Patented Dec. 23, 1879.

WITNESSES
Chas E. Hibbard
L. L. Tilden

INVENTOR
Hugh C. Robertson
By Chas B. Tilden
Attorney

UNITED STATES PATENT OFFICE.

HUGH C. ROBERTSON, OF CHELSEA, MASSACHUSETTS.

IMPROVEMENT IN COVERS FOR TEA AND COFFEE POTS.

Specification forming part of Letters Patent No. 222,840, dated December 23, 1879; application filed September 24, 1879.

*To all whom it may concern:*

Be it known that I, HUGH C. ROBERTSON, of Chelsea, Massachusetts, have invented an Improvement in Covers for Tea and Coffee Pots, of which the following is a specification.

My invention relates to tea and coffee pots; and it consists in a detachable cover so constructed and connected to the pot that it will be held in position during all the ordinary manipulation or handling of said pot, while it may be instantly removed and wholly disconnected from the pot by simply lifting it vertically.

Figure 1:
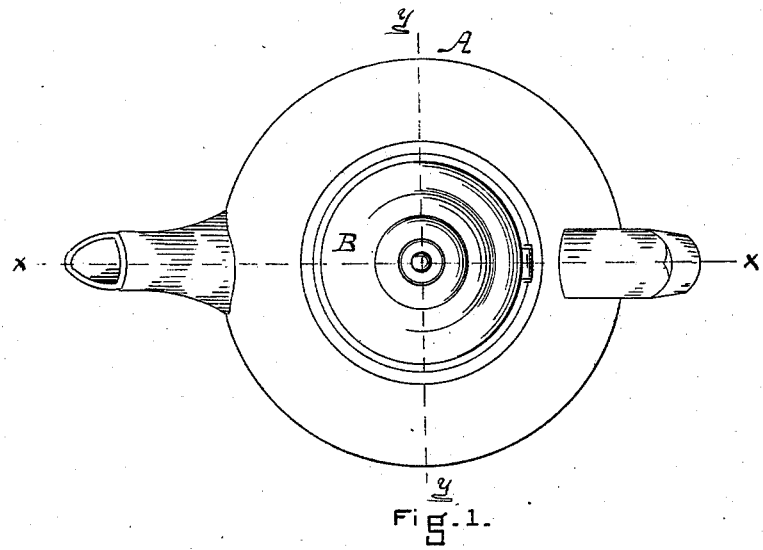
Figures 2, 3:
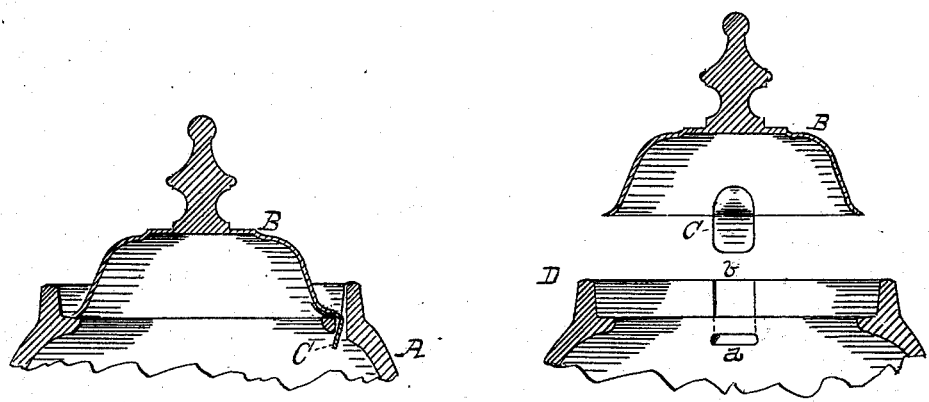
Figure 4:
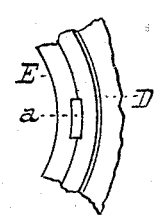

In the drawings forming part of this specification, Figure 1 is a plan view of a tea or coffee pot with my invention attached. Fig. 2 is a section of Fig. 1, taken upon the line $x\ x$ of that figure. Fig. 3 is a section of Fig. 1, taken on the line $y\ y$, showing the cover detached, and illustrating the means by which it is connected to the pot. Fig. 4 is a detail view, showing the rim and the verge of the pot, and illustrating more fully the construction shown in Fig. 3.

A in said drawings indicates the pot, and B the cover. The former I construct of common pottery or earthen ware, glazed and ornamented in the usual manner. The cover I make of metal, struck up into shape or formed in any other suitable manner. To the edge of this metallic cover I attach, by soldering or otherwise, a metal clasp, C, projecting very slightly toward the rear, and then bent downward until it is in the form substantially shown in Fig. 2, the clasp making an acute angle with the plane of the bottom of the cover.

D is the rim of the pot, and E is the verge. In the verge E, I cut, mold, or otherwise form an opening, $a$, extending through the verge, and of sufficient size to admit the clasp C. I also form in the rim D a shallow groove, $b$, the rear wall of which is nearly, or perhaps perfectly, vertical. The object of this groove is to permit the clasp to drop into the opening $a$ easily. The point of the clasp C being bent slightly forward, it is necessary to make the groove of such depth that the angle of the clasp may enter it so far as to enable the point of the said clasp to pass the edge of the opening $a$ and drop into it.

When the cover is attached in the manner shown and described, the clasp C hooks over the verge, and is not easily displaced even when the pot is partly inverted.

The form which I impart to the clasp by bending it in the manner described is an important, though not an absolutely essential, feature of my invention. By employing it, however, the cover is secured to the pot much more perfectly, and the latter may be inverted to a far greater degree without the cover falling off, than would be possible with a perfectly-straight clasp.

My invention enables me to furnish to the trade a better article, highly ornamental, and greatly cheaper than any wares of the kind heretofore produced.

Having thus fully described my invention, what I claim as new, and desire to secure by Letters Patent of the United States, is—

1. An earthenware tea or coffee pot having a metallic cover, said cover being connected to the pot by means of a metallic clasp passing through an opening formed in the verge, and thereby preventing the cover from falling off when the pot is partly inverted, substantially in the manner set forth.

2. In combination with the pot A, the cover B, having a clasp, C, the pot being provided with an opening, $a$, formed in the verge E, substantially in the manner described.

3. As a new article of manufacture, an earthenware pot, A, provided with rim D and verge E, with groove $b$ and aperture $a$ formed in said rim and verge, and provided with cover B, having clasp C, which is slightly bent forward or hooked, as and for the purpose set forth.

In testimony whereof I have signed my name to this specification in the presence of two subscribing witnesses.

HUGH C. ROBERTSON.

Witnesses:
  CHAS. E. HIBBARD,
  CHAS. B. TILDEN.